Aug. 11, 1953  E. L. CROSTON ET AL  2,648,262
FIBROUS MATERIAL EXTRUSION APPARATUS
Filed Sept. 3, 1948  2 Sheets-Sheet 1
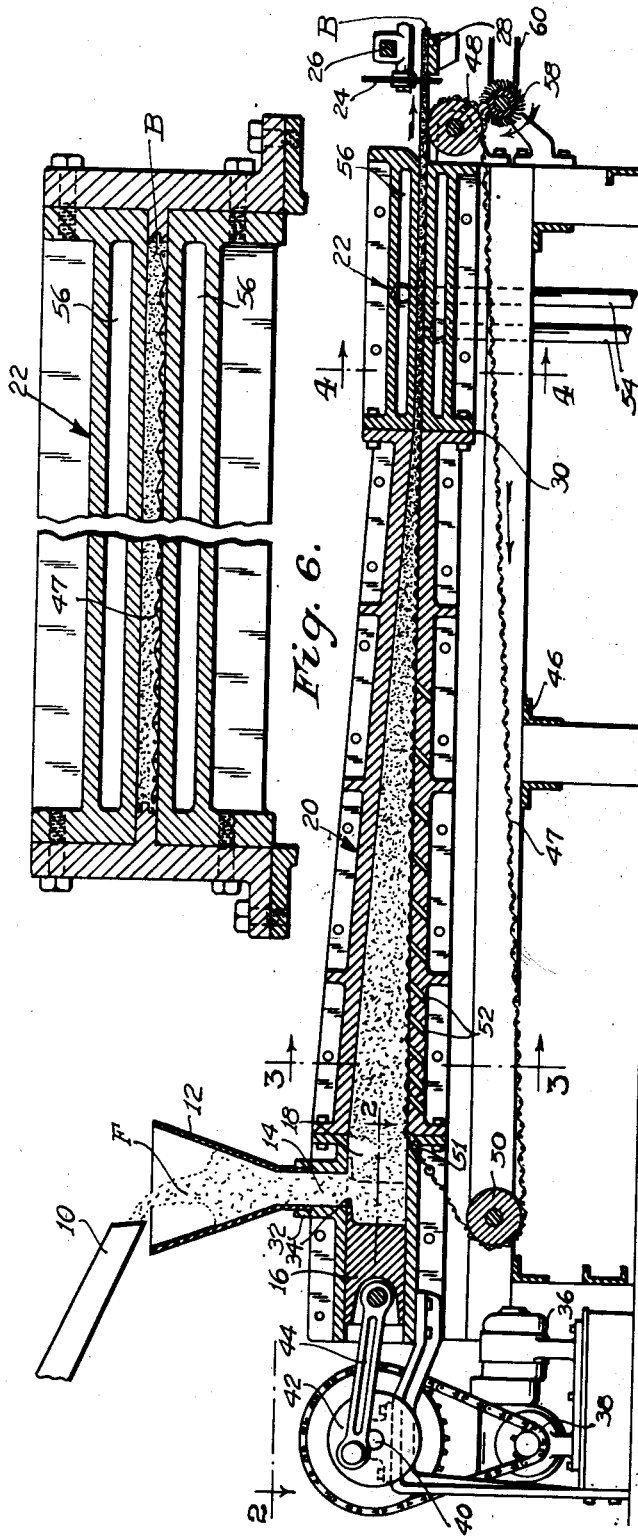
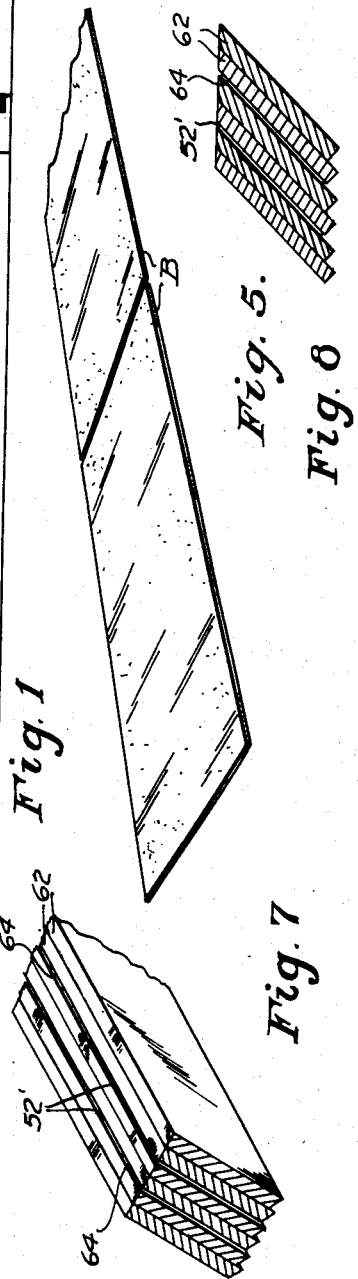
INVENTORS
Edward L. Croston
Horace R. Harbord
ATTORNEYS.

Aug. 11, 1953 E. L. CROSTON ET AL 2,648,262
FIBROUS MATERIAL EXTRUSION APPARATUS
Filed Sept. 3, 1948 2 Sheets-Sheet 2

INVENTORS
Edward L. Croston
Horace R. Harbord
BY Reynolds & Beach
ATTORNEYS.

Patented Aug. 11, 1953

2,648,262

UNITED STATES PATENT OFFICE 2,648,262

FIBROUS MATERIAL EXTRUSION APPARATUS

Edward L. Croston, Dash Point, and Horace R. Harbord, Tacoma, Wash., assignors to American Manufacturing Company, Inc., Tacoma, Wash., a corporation of Washington Application September 3, 1948, Serial No. 47,578

9 Claims. (Cl. 92—61)

This invention relates to automatic extrusion apparatus for the manufacture of fiberboard by a continuous process, and is concerned particularly with manufacturing fiberboard sheets of the highly compacted or "hardboard" type. However, it will be appreciated that the composition, form and hardness of the final product is a matter of selection or degree and may be controlled in various ways; and since use of the invention is not particularly limited in these respects, the term "fiberboard" is used herein in its general connotation.

The ligno-cellulose fibers used in the process may be produced in well known ways from various types of available raw materials, such as wood chips, bigasse, or the like. When a water-soaked mass of such fiber is placed under pressure to form the fiberboard mat, water retained in the mass is forced out and must be removed from the pressing chamber to facilitate compressing and curing the mat to form the board. The amount of water yielded in this manner depends upon such variable factors as the wetness of the initial raw material and the method of handling the mass of fibers preliminary to pressing it.

One of the objects of the invention is to make provision for continuous removal of this water and any other fluid from our extrusion machine during the extrusion process, including trapped air, without interfering in any way with the compacting and compressing operation. To prevent spottiness affecting relative compressibility of the mat in different regions and curing or setting-up time of the binder subsequent to compression, the water is removed substantially uniformly over the entire width of the mat.

Inevitably, small quantities of free moisture will be retained in the mat even after its compression to substantially the final thickness, as well as the moisture absorbed by the fiber. From such moisture steam is formed during the subsequent heating and pressing operation when the binder is cured, if any is incorporated in the fiber mass. Again, facilities to enable this steam to escape are provided, so that it will not disrupt the uniformity of the final product.

In providing apparatus solving the water and steam removal problems, we have at the same time incorporated in our apparatus a further important characteristic, namely that of tending to cause all portions of the mat to move at a uniform rate through the compression and heating chambers, thus determining the degree of compression of the fiberboard mat at a predetermined value. Moreover, the surface of the sheet is compacted and polished, with the fibers of such surface generally aligned, and enabling the extrusion process to be accomplished with a minimum of effort.

Other important objects of the invention relate to such considerations as simplicity of design, economy of construction and operation, and durability of the machine. As the description proceeds in connection with the accompanying drawings, further features and advantages of our fiber products extrusion machine will become apparent.

Figure 1 is a vertical longitudinal sectional view of the extrusion machine and associated apparatus for charging it and removing the final product therefrom.

Figure 5 is a perspective view of fiberboard sheet produced by the machine and cut into lengths.

Figure 6 is a transverse sectional view taken on a line corresponding to line 4—4 of Figure 1, but of an alternative form of heating chamber, having tongue-and-groove forming side walls.

Figure 7 is a fragmentary top perspective view of an alternate form of bed plate for the machine, and Figure 8 is a transverse sectional view through the bed plate.

Figure 4:
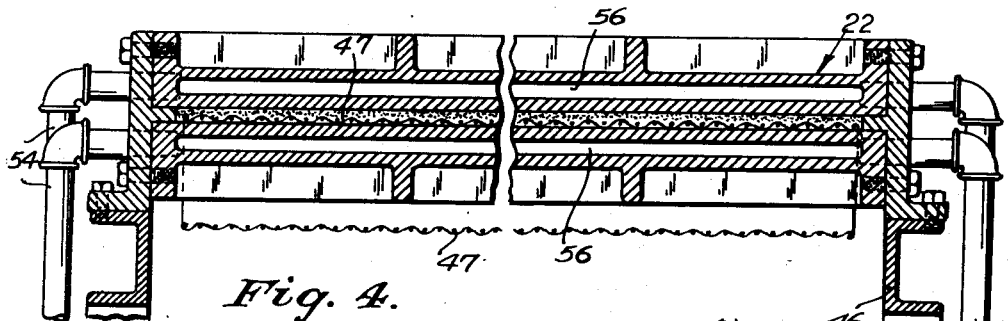
Figure 4 is a transverse section taken on line 4—4 of Figure 1 through the heating chamber of the machine.

A particular feature of the invention to keep in mind resides in the tapered compression chamber of an extrusion type machine through which the fibrous material is forced to form a progressively compacted mat, and an endless carrier strip or belt movable progressively with the mat through the chamber, and preferably driven by frictional engagement of the material with the belt as the material is forced through the machine. Preferably, the carrier strip and mat continue together beyond the principal compression chamber and through a heating chamber joined to the discharge end of the main compression chamber.

Fibrous material F, preferably finely shredded or comminuted from any suitable waste woody material, after being formed into a mat from a water bath, is commonly known as wet fibrous material. Such material is carried to the delivery chute 10 of the machine by any suitable means and from it deposited into the feed hopper 12. From this hopper the material drops into the elongated intake throat 14 extending the full width of the machine, care being taken to insure that the material is distributed substantially uniformly along the entire length of the throat. Such throat communicates with a loading chamber 18, herein referred to as the plunger guide chamber, into which the fibrous material drops by gravity.

Since in the illustrated case the fiberboard mat is compressed only in the direction of its thickness, the horizontal width of the plunger guide chamber corresponds approximately to the desired width of the fiber product, sheet material being selected as a typical example for illustration, although other shapes may be extruded in our machine by modifying the shape of the compression chamber appropriately. It will be appreciated, however, that this width, as well as the depth of the extrusion chamber, could decrease progressively where it is desired that the fiber be compressed both in width and thickness as it is formed to final shape in the machine.

The plunger guide chamber 18, located beneath the throat 14 of the hopper 12, communicates with the larger end of the tapered compression chamber 20. The ram of plunger 16 is elongated transversely of the compression chamber, and as it reciprocates it forces into the compression chamber fibrous material which has dropped from the hopper into the loading chamber. Thus the plunger 16, serving as a valve, cooperates with the hopper's throat 14, constituting the valve port, to admit intermittently charges of fibrous material from the hopper with each return stroke of the plunger, and on each forward stroke the plunger packs the charge into the tapered compression chamber. As the charge is thus pressed sufficient pressure is exerted on the entire load of fiber in the compression chamber to advance it through a predetermined increment. The rate of extrusion from the discharge end of the compression chamber is thus determined by the length and frequency of the plunger stroke, as related to the degree of compression of the fibrous material produced by the particular design of compression chamber.

From the compression chamber 20 the compressed mat passes through heating chamber 22 contiguous with its discharge end for curing the fiberboard binder. It is preferred that the heating chamber taper in height, in the same direction as the compression chamber, although to a very slight degree, to compact the fibrous mat a final amount as residual moisture in the form of steam is driven from it at that time. From the heating chamber the fiberboard B emerges cured and ready to be cut into desired lengths, as indicated in Figure 5. For this purpose, the board passes over a supporting table 28 and is cut by the saw 24 slidable on the track 26 transversely of the machine.

In supplying the machine with fibrous material it is desirable to distribute the charge uniformly along the elongated hopper 12 throughout its length transversely of the machine, although precise uniformity of distribution is not required since the initial forward movement of the plunger 16 tends to level out or spread the charge uniformly over the length of the plunger before it is compressed against the end of the mat in the compression chamber.

In the illustrated machine, the piston guide chamber 18, the compression chamber 20 and the heating chamber 22 are formed in separate sections, bolted together at their adjoining ends by suitable flanges projecting outwardly from the chamber walls, as shown at 30. The relatively long and narrow hopper 12, spaced a short distance from the initial taper of the compression chamber 20, seats inside the upper edge of the elongated rim 32 of the intake throat 14 projecting above the top of the piston guide chamber 18. The upper side of the plunger 16 has a forwardly projecting lip or flange 34, which cuts off the fibrous material between the throat 14 and the chamber 18 and closes off the base of the intake throat during forward movement of the plunger 16. The plunger's most forward position brings its lip or flange approximately to the location shown by the broken lines in Figure 1. The length of plunger stroke is not critical, nor is the length of the plunger guide chamber 18 beyond the hopper location, in the direction of plunger movement.

Figure 2:
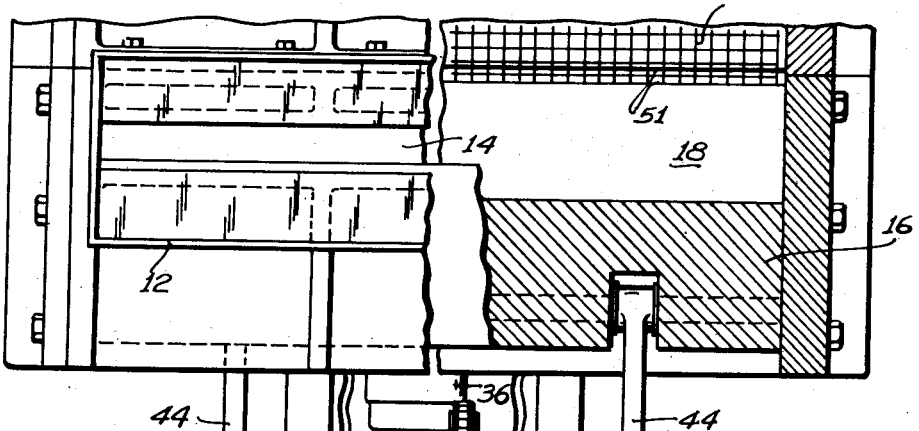
Figure 2 is a fragmentary plan view, with parts broken away, of the infeed end of the machine, showing principally the plunger mechanism for forcing the fibrous material into and through the compression chamber.

The plunger-reciprocating mechanism includes the geared electric motor 36 driving a countershaft 40 through the chain and sprocket drive 38. Such countershaft carries two crank wheels 42 at spaced locations as shown in Figure 2, each having an eccentric crank pin securing it to one end of a connecting rod 44, the other end of which is pivoted on a rod embedded in the plunger 16. The rate of reciprocation of the plunger and length of the plunger stroke are dictated by the desired degree of compression of the fiberboard and the rate of delivery of the fiberboard product from the machine, as will be evident.

As a matter of convenience in construction, the contiguous lower surfaces of the three successive chambers are coplanar and level, the chamber structures being supported directly upon a suitable frame 46. The compression chamber upper wall is sloped downwardly from the piston guide chamber 18 at an angle in the order of and preferably less than 10 degrees. The taper angle should not be too great or the force required to extrude the material will be excessive without a commensurate gain in useful compression of the mat, whereas a taper which is too slight unnecessarily extends the length of the machine and adds to the total frictional resistance to material movement. The heating chamber upper wall is sloped in the same direction at a substantially lesser angle, preferably only a few degrees, because the compression of the mat should not be increased much during the heating step, and in addition great densification is accomplished by a relatively small absolute reduction in thickness at that stage. The upper walls of the compression and heating chambers constitute forming or molding walls and must be smooth, both to reduce the friction of the extrusion operation to a minimum and to impart to the finished fiberboard product a smooth surface. During its progress through the machine the upper surface fibers are generally aligned, as well as compacted, by the ironing action of the mat sliding along the smooth compression chamber surface. The requirement of smoothness does not prevent the surface of the extended sheet being formed with striations or parallel ridges and valleys. To obtain this effect the upper chamber walls in the direction of material flow may be grooved or serrated in any desired pattern. Moreover, the side surfaces may be grooved or ridged to configure the side edges of the board. This is illustrated in the case of Figure 6, wherein the heating chamber side walls are shaped to form tongue and groove edges on the fiberboard product.

Corresponding compression and heating chamber surfaces, such as their coplanar lower surfaces, are covered by a carrier strip 47 preferably in the form of an endless belt on which the mat rides and against which it is compressed in moving through the machine. The carrier strip preferably is of woven metal screen or cloth. Such a screen enters the compression chamber near its feed end adjacent to the plunger guide chamber 18 through a slot 51 in the bed of the machine and extends therefrom continuously the full length of the succeeding compression and heating chambers, emerging from the heating chamber exit with the board B. It then doubles back around a guide roll 48 and returns around a cooperating guide roll 50 beneath the machine to the reentering point. The screen belt 47 is adapted to slide readily over the supporting chamber surfaces despite heavy pressures exerted against the screen by the mat. In this respect, the screen acts as a bearing element reducing friction of the mat on the lower chamber walls, the screen and chamber surface metals being appropriately selected for minimum friction loss and to resist wear.

In the compression chamber the screen interstices permit escape of water squeezed from the wet mat in the compression operation uniformly from the entire area of the mat. Such water drains from the compression chamber through apertures or ducts 52 in its wall. Such ducts 52 are arranged in rows extending transversely of the compression chamber, which rows preferably are closely spaced near the entrance or receiving end of the compression chamber, where the quantity of liquid exuding from the mat is greatest, and progressively farther apart toward the heating chamber.

Figure 3:
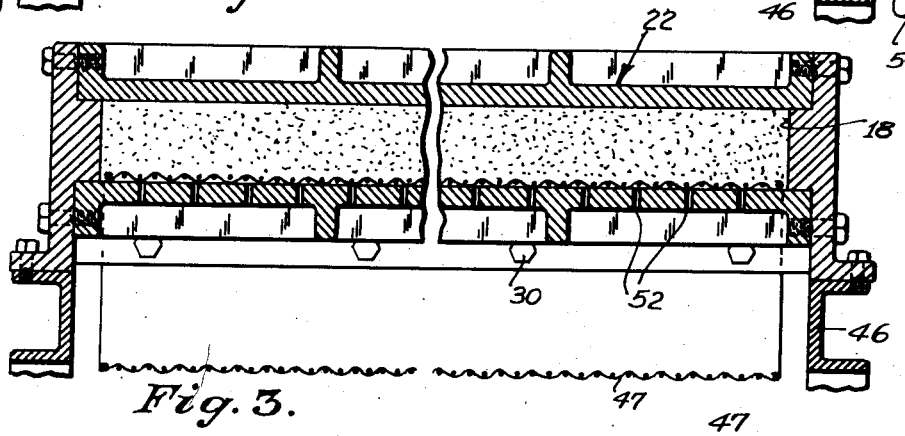
Figure 3 is a transverse section taken on line 3—3 of Figure 1 through the compression chamber of the machine.

In Figures 1 and 3 the drainage apertures are shown as cylindrical holes which are inclined downwardly and opposite to the direction of advance to minimize the tendency for fiber material to be pressed through the screen to plug the holes. An alternative construction is shown in Figures 7 and 8, in which the bed of the machine is of laminated construction, adjacent laminations 62 being spaced apart at predetermined intervals by strips 64. These strips may be extremely thin so that the apertures 52' will be so narrow that fibrous material could not be forced into them, even if the screen belt 47 were omitted. Where the screen belt is employed its mesh should be sufficiently fine to catch the mat fibers and prevent them from entering and clogging the drainage apertures.

In the heating chamber 22 the screen serves the function of facilitating escape of steam driven out of the fiberboard mat, although it is not essential that a screen be employed for this particular purpose. The steam would follow the wires of the screen and escape through the exit opening of the heating chamber.

The screen acts not only as a general carrying element to reduce friction, but it has the important effect of equalizing the rate of advance of the entire mat and limiting the expulsion rate of the finished fiberboard in accordance with the amount of material being injected into the machine, thereby determining the degree of compression obtained. In other words, the screen 47, by its frictional engagement with the mat, causes its thinnest portion near the exit to travel at the same rate as the thickest material near the intake end of the machine, whereas the tendency otherwise is for the thin material to move substantially faster. The effect is to resist acceleration of the thin mat portions by pressure of the mass behind them effected by the driving plunger 16, sufficiently to develop the desired high degree of compression of the fiber mass in the machine. While if the friction between the belt and the bed plate of the press is excessive it may be necessary to apply a positive driving force to the belt, in most installations it is contemplated that the movement of the mat material through the compression chamber 20 and heating chamber 22 effected by the plunger 16 will afford sufficient propulsive effort because of the embedment of the screen in the fiber mat. On the contrary, in some installations it may be desired to apply a braking force to the belt, actually to retard movement of the mat so that the packing action of the plunger will be increased to produce a denser structure throughout the entire mat.

As shown in Figure 1, the screen emerging from the heating chamber is brushed continuously by the rotary brush 58 driven by the belt 60 from a suitable power source (not shown). This prevents accumulation of fibers which might obstruct flow of water or steam through the screen. It should be noted also that the screen slot 51 affords an escape for air trapped by the plunger.

It is to be understood that the source of heat applied in the heating chamber 22 is open to selection. In the illustrated case such heat is supplied by steam admitted through steam pipes 54 to steam jackets 56 (Figure 4) surrounding the heating chamber inner walls. In other cases electric resistance heating may be employed, or heating with high frequency fields, using the heating chamber walls as high frequency electrodes.

We claim as our invention:

1. Fibrous material extrusion apparatus for the manufacture of fiberboard comprising a plunger guide chamber including a side wall having therein a fibrous material admission opening, a tapered compression chamber substantially aligned with and joined to one end of said plunger guide chamber and having walls mutually converging in the direction away from the plunger guide chamber, a heating chamber substantially aligned with and joined to the discharge end of said compression chamber, a plunger guided for reciprocation in said plunger guide chamber to cover said admission opening and to withdraw therefrom by movement toward and away from said compression chamber, respectively, thereby to control admission of fibrous material into said guide chamber and to ram the admitted fibrous material progressively into and through said compression chamber, to form a compressed mat therein, and through said heating chamber for curing of such mat therein, and a sliding endless free-moving carrier screen movable through such compression and heating chambers by frictional drag of the mat thereon driven through such chambers by intermittent ram action of the plunger, such material-driven screen thereby tending to equalize rate of movement of the mat portions in the compression and heating chambers.

2. Fibrous material extrusion apparatus as defined in claim 1, wherein the endless carrier screen enters the common space defined within the mutually adjoining plunger guide chamber and compression chamber through a transverse slot in the bottom wall of one of such chambers at a location therein immediately beyond the limit of travel of the plunger toward the compression chamber.

3. Material extrusion apparatus comprising a tapered compression chamber having an entrance end and an opposite discharge end and having two fixed longitudinal walls converging toward said discharge end, a plunger guide chamber longitudinally contiguous to the entrance end of said compression chamber, a plunger interfitting with said plunger guide chamber and adapted to be reciprocated longitudinally therein positively, means to inject material for extrusion into said plunger guide chamber ahead of said plunger therein to be pressed positively by said plunger longitudinally into and through said compression chamber and out the discharge end thereof, a wire mesh material-retarding carrier strip overlying and slidable progressively upon one of said converging walls longitudinally thereof toward said discharge end by frictional drag of material being forced positively by said plunger through said compression chamber and means guiding said carrier strip for continuously separating the same from the compressed material leaving the compression chamber.

4. Material extrusion apparatus comprising a tapered compression chamber having an entrance end and an opposite discharge end and having two fixed longitudinal walls converging toward said discharge end, a material injection chamber longitudinally contiguous to the entrance end of said compression chamber, positive-acting feed means interfitting with said material injection chamber and operable therein to force material positively into and through said compression chamber and out the discharge end thereof, means to feed material for extrusion into said material injection chamber to be pressed positively by said feed means longitudinally into and through said compression chamber and out the discharge end thereof, a wire mesh material-retarding carrier strip overlying and slidable progressively upon one of said converging walls longitudinally thereof toward said discharge end by frictional drag of material being forced positively by said feed through said compression chamber and strip guide means separating said strip from the compressed material being discharged.

5. Material extrusion apparatus comprising a tapered compression chamber having an entrance end and an opposite discharge end and having two fixed longitudinal walls converging toward said discharge end, a plunger guide chamber longitudinally contiguous to the entrance end of said compression chamber, a plunger interfitting with said plunger guide chamber and adapted to be reciprocated longitudinally therein positively, means to inject material for extrusion into said plunger guide chamber ahead of said plunger therein to be pressed positively by said plunger longitudinally into and through said compression chamber and out the discharge end thereof, and a material-retarding carrier strip overlying and slidable progressively upon one of said converging walls longitudinally thereof toward said discharge end by frictional drag of material being forced positively by said plunger through said compression chamber, said carrier strip comprising one stretch of an endless belt encircling the last-mentioned wall of the compression chamber and guided for progressive circulatory movement therearound accompanying progressive movement of material through the compression chamber effected by the reciprocating plunger.

6. Material extrusion apparatus comprising a tapered compression chamber having an entrance end and an opposite discharge end and having two fixed longitudinal walls converging toward said discharge end, a plunger guide chamber longitudinally contiguous to the entrance end of said compression chamber, a plunger interfitting with said plunger guide chamber and adapted to be reciprocated longitudinally therein positively, means to inject material for extrusion into said plunger guide chamber ahead of said plunger therein to be pressed positively by said plunger longitudinally into and through said compression chamber and out the discharge end thereof, a material-retarding carrier strip overlying and slidable progressively upon one of said converging walls longitudinally thereof toward said discharge end by frictional drag of material being forced positively by said plunger through said compression chamber, said carrier strip comprising one stretch of an endless belt encircling said last-mentioned wall of the compression chamber and guided for progressive movement of material through the compression chamber effected by the reciprocating plunger, and a tapered heating chamber having one end joined to the discharge end of the compression chamber as a continuation thereof and having walls converging toward its discharge end at a materially lesser angle than the angle of convergence of the converging compression chamber walls, the carrier strip overlying and being slidable upon one of such heating chamber walls in continuation of the corresponding compression chamber wall.

7. Apparatus defined in claim 6, the heating chamber wall and corresponding compression chamber wall upon which the carrier strip is slidable being substantially coplanar.

8. Material extrusion apparatus comprising a tapered compression chamber having an entrance end and an opposite discharge end and having two fixed longitudinal walls converging toward said discharge end, a material injection chamber longitudinally contiguous to the entrance end of said compression chamber, positive-acting feed means interfitting with said material injection chamber and operable therein to force material positively into and through said compression chamber and out the discharge end thereof, means to feed material for extrusion into said material injection chamber to be pressed positively by said feed means longitudinally into and through said compression chamber and out the discharge end thereof, and a material-retarding carrier strip overlying and slidable progressively upon one of said converging walls longitudinally thereof toward said discharge end by frictional drag of material being forced positively by said feed through said compression chamber, said carrier strip comprising one stretch of an endless belt encircling the last-mentioned wall of the compression chamber and guided for progressive circulatory movement therearound accompanying progressive movement of material through the compression chamber effected by the feed means.

9. Apparatus defined in claim 8, and a tapered heating chamber having one end joined to the discharge end of the compression chamber as a continuation thereof and having walls converging toward its discharge end at a materially lesser angle than the angle of convergence of the converging compression chamber walls, the carrier strip overlying and being slidable upon one of such heating chamber walls in continuation of the corresponding compression chamber wall.

EDWARD L. CROSTON.
HORACE R. HARBORD.

References Cited in the file of this patent

UNITED STATES PATENTS

| Number | Name | Date |
|---|---|---|
| 454,030 | Clark | June 16, 1891 |
| 910,358 | Chapman | Jan. 19, 1909 |
| 1,266,846 | Mugica | May 21, 1918 |
| 1,707,375 | Upson | Apr. 2, 1929 |
| 1,764,456 | Mantius | June 17, 1930 |
| 1,863,507 | Southgate | June 14, 1932 |
| 1,875,075 | Mason | Aug. 30, 1932 |
| 2,168,288 | Fischer | Aug. 1, 1939 |
| 2,446,644 | Fischer | Aug. 10, 1948 |
| 2,473,269 | Adams | June 14, 1949 |

FOREIGN PATENTS

| Number | Country | Date |
|---|---|---|
| 2,477 | Great Britain | of 1875 |
| 686,884 | France | Apr. 22, 1930 |